(12) United States Patent
Dark (10) Patent No.: US 12,092,545 B2
(45) Date of Patent: Sep. 17, 2024

(54) METHOD AND SYSTEM FOR CENTRIFUGE TESTING

(71) Applicant: Honeywell Federal Manufacturing & Technologies, LLC, Kansas City, MO (US)

(72) Inventor: Phillip Ryan Dark, Kansas City, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 319 days.

(21) Appl. No.: 17/672,794

(22) Filed: Feb. 16, 2022

(65) Prior Publication Data

US 2023/0258523 A1 Aug. 17, 2023

(51) Int. Cl.
| | |
|---|---|
| G01M 1/32 | (2006.01) |
| B04B 9/14 | (2006.01) |
| B04B 13/00 | (2006.01) |
| G01P 21/00 | (2006.01) |

(52) U.S. Cl.
CPC .............. *G01M 1/32* (2013.01); *B04B 9/146* (2013.01); *B04B 13/00* (2013.01); *G01P 21/00* (2013.01)

(58) Field of Classification Search
CPC ........... G01M 1/32; G01M 1/36; B04B 9/146; B04B 13/00; G01P 21/00
See application file for complete search history.

(56) References Cited

U.S. PATENT DOCUMENTS

| | | | | |
|---|---|---|---|---|
| 5,440,937 | A * | 8/1995 | Lynnworth | G01F 1/662 73/861.27 |
| 5,883,347 | A * | 3/1999 | Malesko | B24B 49/105 200/61.45 M |
| 7,545,078 | B2 * | 6/2009 | Ostendarp | B23Q 5/027 310/323.14 |
| 7,694,588 | B2 * | 4/2010 | Stehlin | F41G 5/16 73/862.322 |
| 9,664,515 | B2 * | 5/2017 | Rocchi | G01C 19/5762 |
| 10,533,908 | B1 * | 1/2020 | Freiberger | G01L 1/04 |
| 10,775,257 | B2 | 9/2020 | Platte et al. | |
| 2010/0009833 | A1 | 1/2010 | Ryu et al. | |
| 2024/0050060 | A1* | 2/2024 | Kadokura | A61B 8/0841 |

FOREIGN PATENT DOCUMENTS

| | | | | |
|---|---|---|---|---|
| CN | 109211503 A | * | 1/2019 | ............ G01M 13/00 |
| GB | 2602681 A | * | 7/2022 | ......... G01C 19/5642 |

* cited by examiner

*Primary Examiner* — Octavia Hollington
(74) *Attorney, Agent, or Firm* — Hovey Williams LLP (57) ABSTRACT

A method of testing a sensing device with a sensing mass includes accelerating the sensing device along a circular path about a central axis. The sensing mass of the sensing device may be movable relative to the central axis. The method includes determining a position of the sensing mass of the sensing device via a sensor and shifting the sensing device radially relative to the central axis based at least in part on the position of the sensing mass during acceleration.

17 Claims, 5 Drawing Sheets

METHOD AND SYSTEM FOR CENTRIFUGE TESTING

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Mechanical acceleration sensing devices generally contain sensing masses which move under acceleration. The range of movement of a sensing mass varies among different sensing devices. Centrifuge simulation of acceleration environments are used to determine the accuracy of such sensing devices. Accurate centrifuge simulation of an acceleration environment depends on the accuracy of a determined test radius. Inaccuracy in the test radius causes errors in stimulus acceleration applied to a sensing device as well as the analysis of the accuracy of the sensing device. The errors could be minimized by increasing the test radius; however, this would also increase the cost and footprint of the centrifuge.

The background discussion is intended to provide information related to the present invention which is not necessarily prior art.

SUMMARY OF THE INVENTION

The present invention solves the above-described problems and other problems by providing methods and systems of testing a sensing device that maintains a relatively smaller footprint and increases the accuracy of a simulation, which improves the measurement of the accuracy of the sensing device.

A method of testing a sensing device according to an embodiment of the present invention comprises accelerating the sensing device along a circular path about a central axis; determining a position of a sensing mass of the sensing device via a sensor; and shifting the sensing device radially relative to the central axis based at least in part on the position of the sensing mass during acceleration. By determining the position of the sensing mass during acceleration and adjusting the test radius of the sensing device accordingly, a more accurate acceleration profile is achieved, which enables a better determination of accuracy of the sensing device.

A system for testing an acceleration sensing device according to an embodiment of the present invention broadly comprises a platform, a motor, an actuator, a sensor, and a control system. The platform secures the sensing device and is shiftable relative to a central axis. The motor is operable to accelerate the platform along a circular path about the central axis. The actuator is configured to shift the platform relative to the central axis.

The sensor is configured to generate a signal representative of a position of the sensing mass within the enclosure. The control system is in communication with the sensor and configured to receive the signal from the sensor and cause the actuator to shift the platform based at least in part on the position of the sensing device. By determining the position of the sensing mass during acceleration, the actual acceleration profile is more accurate, which enables a better determination of accuracy of the sensing device.

A method of testing an acceleration sensing device according to another embodiment of the invention comprises accelerating the sensing device along a circular path about a central axis according to an acceleration profile; determining a position of a sensing mass housed in an enclosure of the sensing device via an ultrasonic sensor having a probe that extends into the enclosure; and shifting the sensing device radially relative to the central axis based at least in part on the position of the sensing mass during acceleration. The ultrasonic sensor enables determining the position of the sensing mass without interfering with any electrical signals or the performance of the sensing device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Broadly characterized, embodiments provide an improved testing system for evaluating the performance of electrical/electronic components, circuits, systems, or other products under dynamic operating conditions, including a data acquisition and analysis (iDAQ) system configured to perform in situ data acquisition and real-time data analysis. In some implementations, the data acquisition and analysis system may control the dynamic operating conditions and/or may be subject to the dynamic operating conditions. The electrical/electronic products may be substantially any such convention or non-conventional stand-alone, partial, and/or integrated products and may be generally referred to as the unit(s) under test (UUT). Embodiments provide a particular solution to a particular problem in a particular field, and in some implementations, as discussed below, one or more particular machines may be integral to the particular solution. More details of the iDAQ system are disclosed in U.S. patent application Ser. No. 16/238,702, entitled "IN SITU DATA ACQUISITION AND REAL-TIME ANALYSIS SYSTEM", filed on Jan. 3, 2019, which is hereby incorporated into the present application by reference in its entirety.

Figure 1:
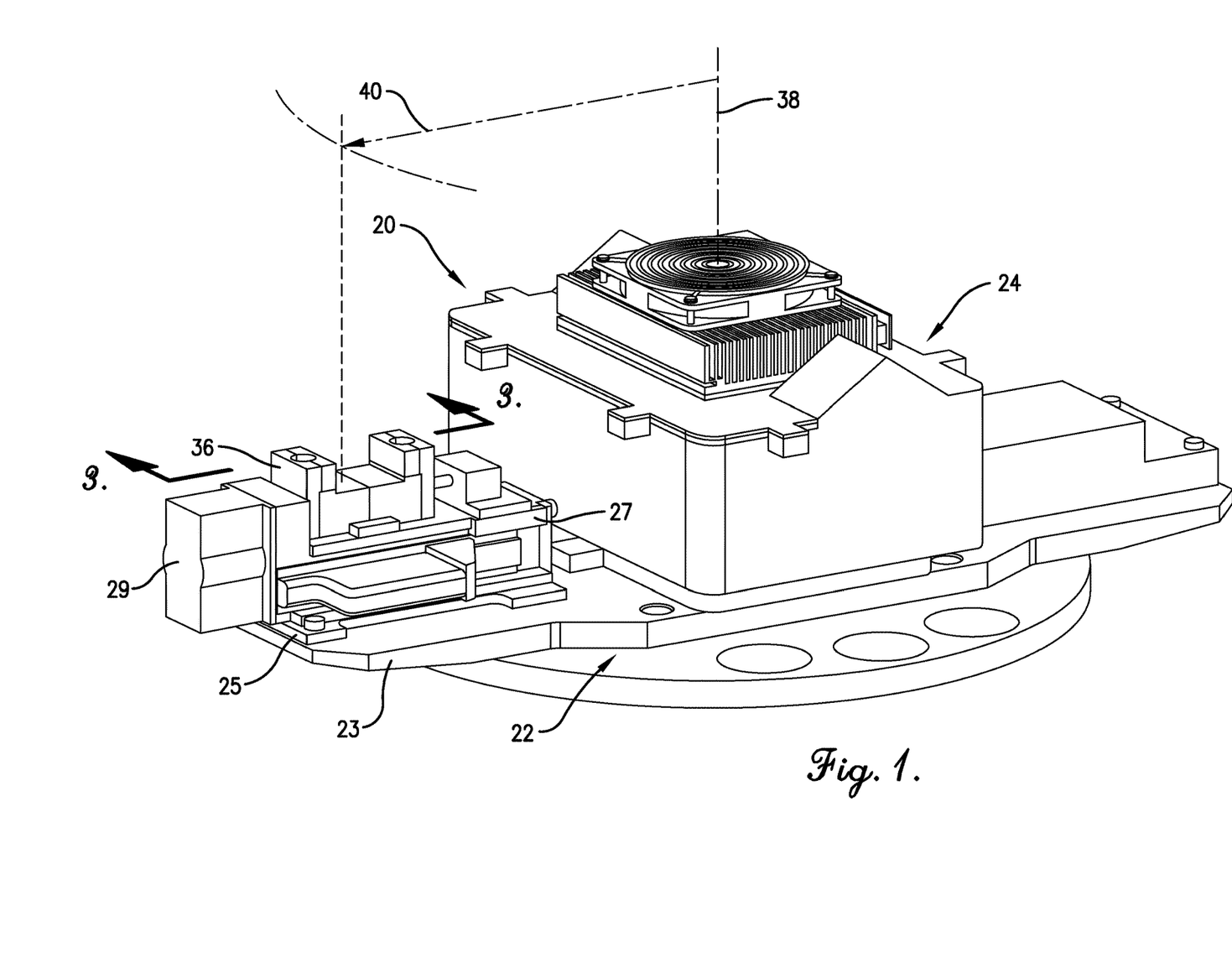
FIG. 1 is a perspective view of a testing system for a unit under test constructed in accordance with embodiments of the present invention.
Figure 2:
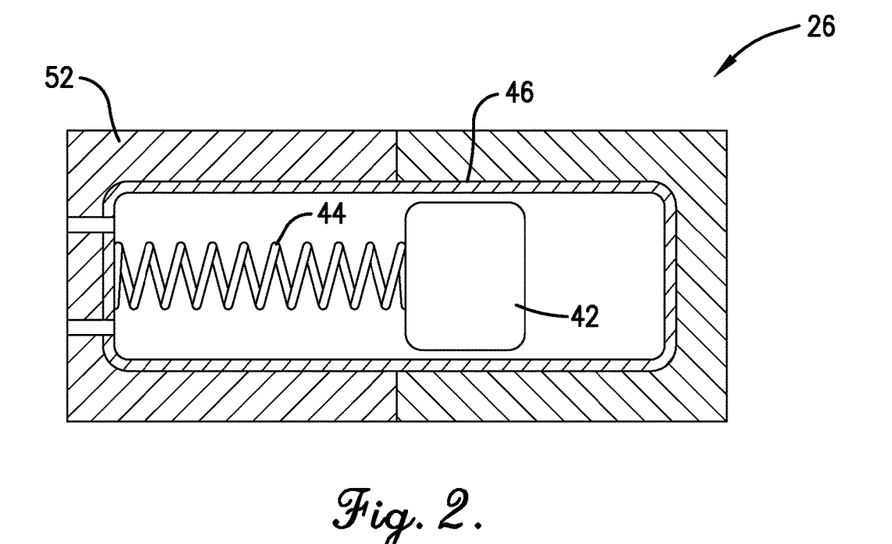
FIG. 2 is a sectional view of the unit under test in a clam shell holder of the testing system of FIG. 1 along line 2-2.

Referring to FIG. 1, an embodiment of a testing system 20 is shown configured to evaluate the performance of and otherwise perform testing on electrical/electronic UUTs and including a dynamic testing component 22 and an iDAQ system 24 configured for in situ testing of a UUT 26 (depicted in FIG. 2). As a non-limiting example, the dynamic testing component 22 is shown in FIG. 1 as a centrifuge apparatus, and the testing system 20 includes the iDAQ system 24 and a retention mechanism 36 for securing the UUT 26, so that the iDAQ system 24 can measure the performance of the UUT 26 as the UUT 26 experiences dynamic centrifugal forces. The UUT 26 may be positioned a radial distance from the central axis 38 of the testing component 22 along the depicted radial line 40.

The testing component 22 may include a beam 23, a track 25, a platform 27, and an actuator 29. The beam 23 supports the track 25 and is operable to be rotated about the central axis 38 via a motor (discussed further below). The track 25 is positioned on the beam 23. The platform 27 is shiftable along the track 25 and supports the retention mechanism 36. The actuator 29 is configured to shift the platform 27 along the track 25 to affect the radial distance 40 between the central axis 38 and the UUT 26. The actuator 29 may be a linear motor, hydraulic actuator, pneumatic actuator, or the like.

Turning to FIG. 2, the UUT 26 may be a sensing device, such as a mechanical acceleration sensor secured to the testing component via a clamshell holder 52. The UUT 26 may include a sensing mass 42 biased at a rest position via a biasing element 44 and housed in an enclosure 46. The UUT 26 may be configured to generate a signal representative of an acceleration of the UUT 26 based on a displacement of the sensing mass 42 from the rest position. The sensing mass 42 and the biasing element 44 may be configured any number of ways without departing from the scope of the present invention. For example, the biasing element 44 may be position on either side of the sensing mass 42. There also may be any number of biasing elements 44 without departing from the scope of the present invention. For example, there may be a biasing element 44 on both sides of the sensing mass 42. Additionally, the biasing element 44 may be biased in an extended or retracted position.

Figure 3:
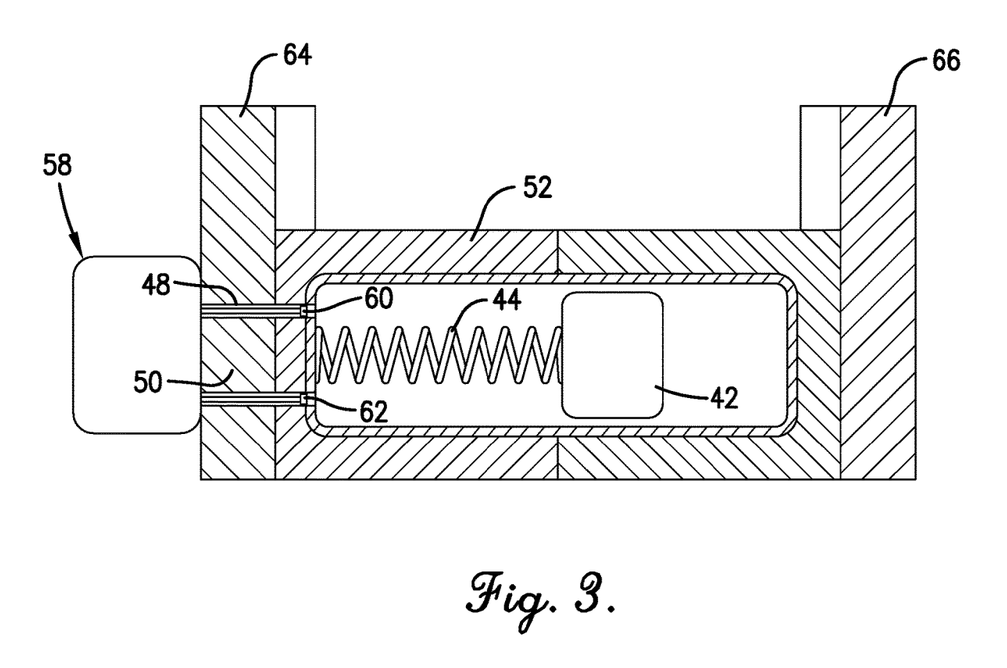
FIG. 3 is a sectional view of a testing setup for the unit under test and a sensor of the testing system of FIG. 1 along line 2-2.

Turning to FIG. 3, the testing component 22 includes a position sensor 58 for detecting a position of the sensing mass 42. The dynamic testing component 22 may include clamping plates 64, 66 that are used to clamp the clamshell holder 52, and the position sensor 58 may be positioned proximate to one of the clamping plates 64, 66. The position sensor 58 may comprise a distance-measuring device, such as a light detection and ranging (LIDAR) sensor, a radio detection and ranging (RADAR) sensor, an optical sensor (such as a camera), or the like. In some embodiments, the position sensor 58 is an ultrasonic sensor comprising one or more probes 60, 62 extending through clamping plate 64 and the clamshell holder 52 via one or more channels 48, 50. The probes 60, 62 may extend through the channels 48, 50 and terminate at or within the enclosure 46. One of the probes 60 may be configured to transmit ultrasonic waves in the enclosure 46, and the other probe 62 may be configured to receive ultrasonic waves, or echoes, reflected off the sensing mass 42. The sensor 58 may be configured to generate a signal representative of a distance between the probes 60, 62 and the sensing mass 42.

Figure 4:
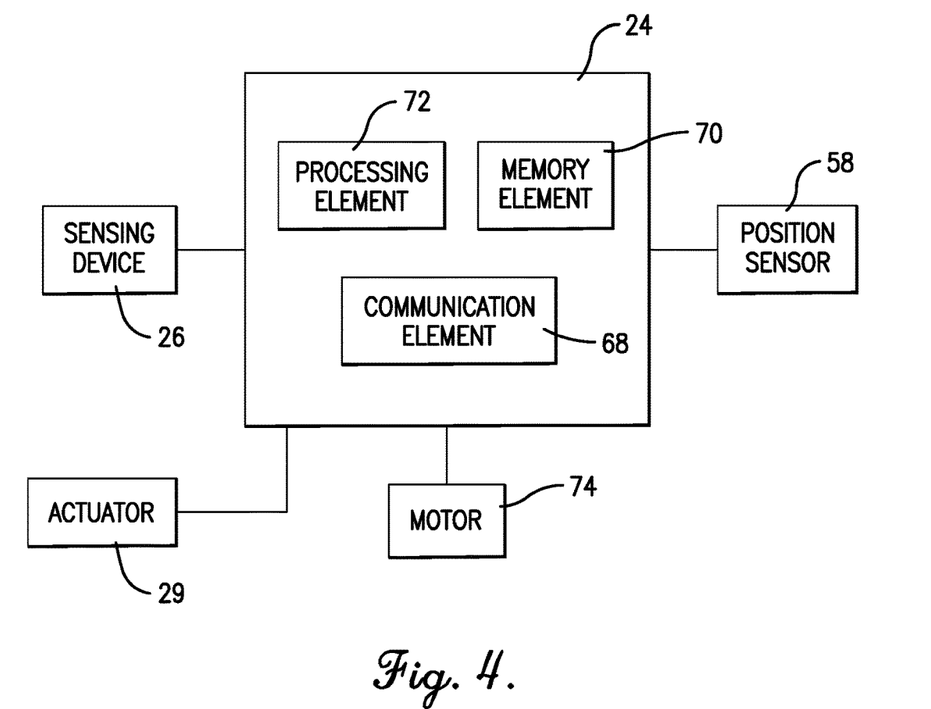
FIG. 4 is a high-level block diagram of select components of the testing system of FIG. 1.

Turning to FIG. 4, the iDAQ system 24 may comprise a communication element 68, a memory element 70, and a processing element 72. The communication element 68 may generally allow communication with systems or devices external to the iDAQ system 24. The communication element 68 may include signal or data transmitting and receiving circuits, such as antennas, amplifiers, filters, mixers, oscillators, digital signal processors (DSPs), and the like. The communication element 68 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 68 may be in communication with the processing element 72 and the memory element 70.

The memory element 70 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 70 may be embedded in, or packaged in the same package as, the processing element 72. The memory element 70 may include, or may constitute, a "computer-readable medium". The memory element 70 may store the instructions, code, code segments, software, firmware, programs, applications, apps, services, daemons, or the like that are executed by the processing element 72.

The processing element 72 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 72 may generally execute, process, or run instructions, code, code segments, software, firmware, programs, applications, apps, processes, services, daemons, or the like. The processing element 72 may also include hardware components such as finite-state machines, sequential and combinational logic, and other electronic circuits that can perform the functions necessary for the operation of the current invention. The processing element 72 may be in communication with the other electronic components through serial or parallel links that include address busses, data busses, control lines, and the like.

For example, the iDAQ system 24 may be in communication with the UUT 26, the actuator 29, the position sensor 58, and a motor 74 of the testing component 22. Specifically, the processing element 72 may be in communication with the above components via the communication element 68 and/or direct wiring. The processing element 72 of the iDAQ system 24 may be configured to send and/or receive information to and/or from the above components via the communication element 68. The processing element 72 of the iDAQ system 24 may also be configured to send and/or receive commands to and/or from the above components via the communication element 68.

The processing element 72 of the iDAQ system 24 may be configured to direct the testing component 22 to accelerate the UUT 26 along a circular path. The processing element 72 may be configured to direct the motor 74 of the testing component 22 to rotate the UUT 26 at a calculated rotations per minute (RPM) to achieve a desired acceleration profile. The acceleration profile may include a target acceleration rate, or series of acceleration rates, based on a known radial distance 40 from the central axis 38 to the UUT 26, e.g., a known reference point.

The processing element 72 may also be configured to determine a position of the sensing mass 42 via the position sensor 58. The communication element 68 of the iDAQ system 24 may be configured to receive a signal representative of the position of the sensing mass 42 from the position sensor 58. The processing element 72 may be configured to determine a radial distance 40 of the mass 42 from the central axis 38 by accounting for the detected position of the sensing mass 42 with the known radial distance to the UUT 26, or reference point. The processing element 72 may be configured to log the positions of the sensing mass 42 over time and store the positions over time on the memory element 70.

Figure 5A:
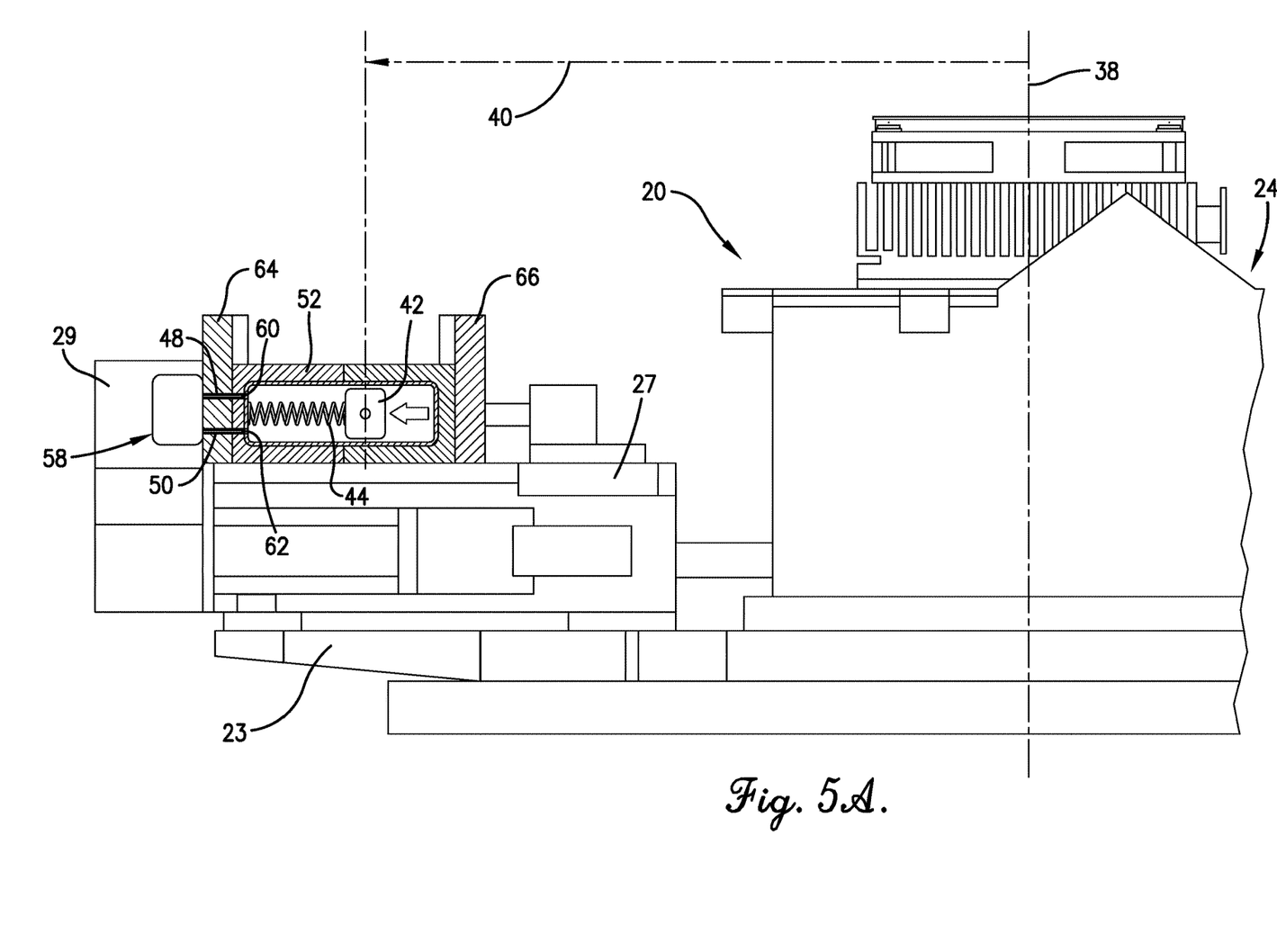
FIG. 5A is a side view of the testing system of FIG. 1 with the unit under test at a first position.
Figure 5B:
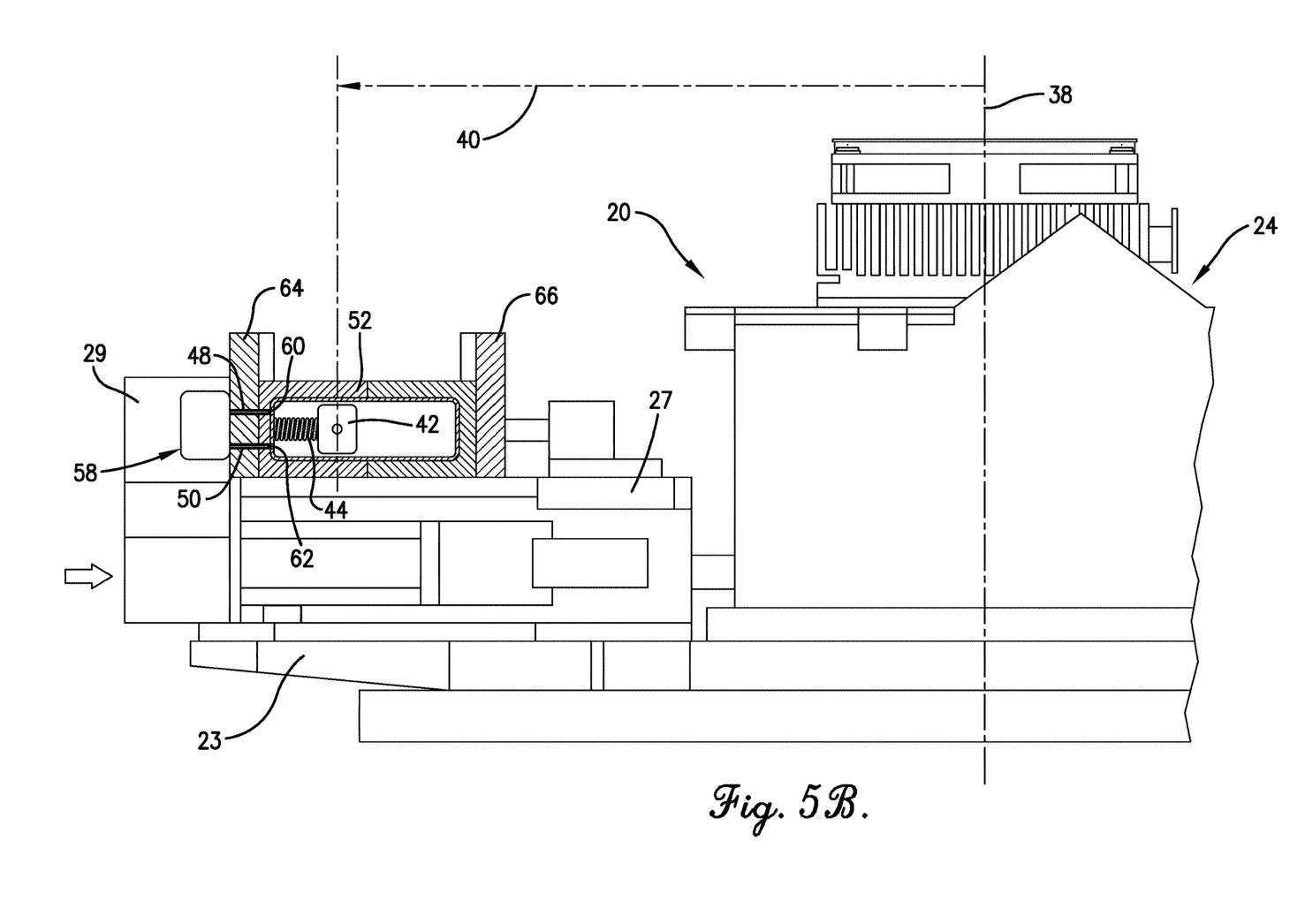
FIG. 5B is a side view of the testing system of FIG. 1 with the unit under test at a second position.

The processing element 72 may be configured to direct the actuator 29 to shift the platform 27 to maintain a desired radial distance 40 from the central axis 38. For example, as depicted in FIG. 5A, the sensing mass 42 is at the test radius 40 from the central axis 38 when the testing component 22 is at rest. As the motor 74 accelerates the beam 23, a centripetal force (indicated by the arrow) causes the sensing mass 42 to shift radially away from the central axis 38. Turning to FIG. 5B, the processing element 72 may be configured to detect the shifting of the sensing mass 42 and direct the actuator 29 to shift the platform 27 and therefore the UUT 26 radially toward the central axis 38 (as indicated by the arrow) in order to maintain the sensing mass 42 at the same length 40 from the central axis 38. As the acceleration of the UUT 26 decreases, the processing element 72 may be configured to shift the platform 27 and therefore the UUT 26 radially outward away from the central axis 38 to account for the sensing mass 42 returning to its original position. As used herein, the test radius 40 may include a range of acceptable radiuses without departing from a scope of the present invention. For example, the processing element 72 may be configured to determine whether the current position of the sensing mass 42 is above or below a threshold of a desired test radius 40 and direct the actuator 29 accordingly.

In some embodiments, the iDAQ 24 may also be configured to analyze the accuracy of the UUT 26. For example, the communication element 68 may be configured to receive a signal representative of a sensed acceleration emitted from the UUT 26 in response to the acceleration. The processing element 72 may be configured to receive the sensed acceleration from the communication element 68 and compare the actual acceleration profile with the sensed acceleration of the UUT 26 to determine an accuracy of the UUT 26.

Figure 6:
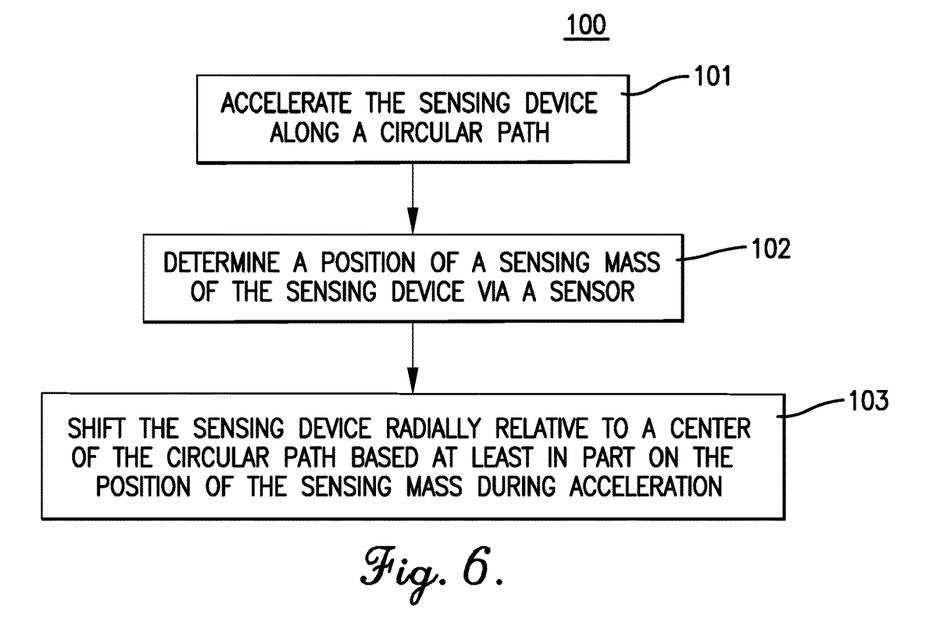
FIG. 6 is a flowchart depicting exemplary steps of a method according to an embodiment of the present invention.

The flow chart of FIG. 6 depicts the steps of an exemplary method 100 of testing a sensing device. In some alternative implementations, the functions noted in the various blocks may occur out of the order depicted in FIG. 6. For example, two blocks shown in succession in FIG. 6 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-5B. The steps of the method 100 may be performed by the iDAQ system 24 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, the sensing device, e.g., the UUT, is accelerated along a circular path. This step may include directing, via the iDAQ system, the testing component to accelerate the UUT along a circular path. For example, this step may include directing, via the iDAQ system, the motor of the testing component to rotate the UUT at a calculated RPM to achieve a desired acceleration profile. The desired acceleration profile may include a target acceleration rate, or series of acceleration rates, based on a known radial distance between the central axis to the UUT, e.g., a known reference point.

Referring to step 102, the position of the sensing mass of the UUT is determined via a sensor. This step may include receiving, at the iDAQ system, a signal representative of the position of the sensing mass from the position sensor of the testing component. This step may include determining, via the iDAQ system, a radial distance between the mass from the central axis by accounting for the detected position of the sensing mass with the known radial distance to the UUT, or reference point. This step may include logging the positions of the sensing mass during acceleration over time.

Referring to step 103, the sensing device is shifted radially relative to the central axis based at least in part on the position of the sensing mass during acceleration. This step may include directing, via the iDAQ system, the actuator to shift the platform and therefore the UUT along the track on the beam. The UUT may be shifted in a direction toward the central axis or away from the central axis depending on the detected position of the sensing mass. The UUT may be shifted so that the distance between the sensing mass and the central axis remains generally constant throughout the test.

The method 100 may include additional, less, or alternate steps and/or device(s), including those discussed elsewhere herein. For example, the method 100 may further comprise analyzing the accuracy of the UUT. This may include receiving, at the iDAQ system, a signal representative of a sensed acceleration emitted from the UUT in response to the acceleration and comparing, via the iDAQ system, the actual acceleration profile with the sensed acceleration of the UUT to determine an accuracy of the UUT Additional Considerations In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of testing a sensing device, the method comprising:
   accelerating the sensing device along a circular path about a central axis;
   determining a position of a sensing mass of the sensing device via a sensor; and
   shifting the sensing device radially relative to the central axis along a track positioned on a beam of a centrifugal testing component based at least in part on the position of the sensing mass during acceleration.

2. The method of claim 1, further comprising receiving a signal emitted from the sensing device in response to the acceleration, the signal being representative of a sensed acceleration.

3. The method of claim 1, wherein the shifting of the sensing device comprises shifting the sensing device so that the sensing device stays within a predetermined range of test radiuses.

4. The method of claim 1, wherein the sensor is an ultrasonic sensor.

5. The method of claim 4, wherein the ultrasonic sensor comprises two or more probes extending into the sensing device.

6. The method of claim 1, wherein the position of the sensing mass is determined by detecting a distance between the mass and a reference point.

7. The method of claim 1, wherein the sensor is a laser distance measuring sensor.

8. The method of claim 1, wherein the sensing device is positioned on a platform shiftable along the track, and the beam is connected to a motor that is operable to rotate the beam about the motor so that the platform moves along the circular path, wherein accelerating the sensing device comprises activating the motor.

9. The method of claim 8, wherein the shifting of the sensing device comprises activating an actuator configured to shift the platform along the track.

10. A system for testing an acceleration sensing device with an enclosure housing a sensing mass, the system comprising:
    a platform for securing the acceleration sensing device and that is shiftable relative to a central axis;
    a motor operable to accelerate the platform along a circular path about the central axis;
    an actuator configured to shift the platform relative to the central axis;
    a sensor configured to generate a signal representative of a position of the sensing mass within the enclosure; and
    a control system in communication with the sensor and configured to receive the signal from the sensor and cause the actuator to shift the platform along a track based at least in part on the position of the sensing mass so that the sensing mass is maintained within a predetermined range of radiuses from the central axis.

11. The system of claim 10, wherein the sensor is an ultrasonic sensor.

12. The system of claim 10, wherein the control system comprises a processing element configured to receive a signal representative of a sensed acceleration from the acceleration sensing device and compare the sensed acceleration to a test acceleration profile to determine an accuracy of the acceleration sensing device.

13. A method of testing an acceleration sensing device, the method comprising:
    accelerating the sensing device along a circular path about a central axis according to an acceleration profile;
    determining a position of a sensing mass housed in an enclosure of the sensing device via an ultrasonic sensor having probes that extend into the enclosure; and
    shifting the sensing device radially relative to the central axis along a track positioned on a beam of a centrifugal testing component based at least in part on the position of the sensing mass during acceleration.

14. The method of claim 13, further comprising—
    receiving a signal representative of a sensed acceleration emitted from the sensing device in response to the acceleration; and
    comparing the acceleration profile with the sensed acceleration to determine an accuracy of the sensing device.

15. The method of claim 13, wherein the shifting of the sensing device comprises maintaining the sensing mass at a desired test radius relative to the central axis.

16. The method of claim 13, wherein the shifting of the sensing device comprises activating, via a processing element, an actuator that shifts the sensing device.

17. The method of claim 13, wherein shifting the sensing device comprises shifting the sensing device closer to the central axis.

* * * * *